(12) United States Patent
Meidinger

(10) Patent No.: US 7,647,982 B2
(45) Date of Patent: Jan. 19, 2010

(54) SCRAPER WITH ROTATING BLADE FOR ENGAGING A ROTATING DISK

(75) Inventor: James Meidinger, Wishek, ND (US)

(73) Assignee: Discmaster, Inc., Wishek, ND (US)

( * ) Notice: Subject to any disclaimer, the term of this patent is extended or adjusted under 35 U.S.C. 154(b) by 0 days.

(21) Appl. No.: 11/875,008

(22) Filed: Oct. 19, 2007

(65) Prior Publication Data

US 2008/0029280 A1 Feb. 7, 2008

Related U.S. Application Data

(63) Continuation-in-part of application No. 11/524,969, filed on Sep. 21, 2006, now abandoned.

(60) Provisional application No. 60/734,824, filed on Nov. 9, 2005.

(51) Int. Cl.
*A01B 35/28* (2006.01)

(52) U.S. Cl. .................................. 172/559; 172/762

(58) Field of Classification Search ......... 172/561–566, 172/558, 559, 690, 762; 111/139, 140
See application file for complete search history.

(56) References Cited

U.S. PATENT DOCUMENTS

| | | | | |
|---|---|---|---|---|
| 298,911 A | | 5/1884 | Stoddard ..................... | 172/565 |
| 336,711 A | | 2/1886 | Galt et al. ................... | 111/130 |
| 523,508 A | * | 7/1894 | Bauer et al. ................. | 172/559 |
| 539,551 A | * | 5/1895 | Sharp ........................ | 172/565 |
| 975,577 A | | 11/1910 | Shackelford ................ | 172/559 |
| 1,168,594 A | | 1/1916 | Berendes .................... | 172/166 |
| 1,248,953 A | * | 12/1917 | Treadwell ................... | 172/566 |
| 1,260,752 A | | 3/1918 | Casaday ..................... | 172/559 |
| 1,321,040 A | | 11/1919 | Hoffman .................... | 172/187 |
| 1,391,593 A | | 9/1921 | Clarence Sweeting Claude ....................... | 172/187 |
| 1,791,462 A | | 2/1931 | Bermel ....................... | 172/559 |
| 2,430,434 A | * | 11/1947 | Rutter ......................... | 403/92 |
| 2,662,460 A | * | 12/1953 | Klemm et. al. .............. | 172/383 |
| 2,757,593 A | * | 8/1956 | Bowman .................... | 172/603 |
| 2,901,049 A | | 8/1959 | De Haai | |
| 3,718,191 A | * | 2/1973 | Williams .................... | 172/196 |
| 3,833,067 A | * | 9/1974 | Peterson et al. ............. | 172/566 |
| 4,008,770 A | * | 2/1977 | Boone et al. ................ | 172/566 |
| 4,113,030 A | | 9/1978 | Walker ....................... | 172/566 |
| 4,206,817 A | | 6/1980 | Bowerman .................. | 172/559 |
| 4,295,532 A | | 10/1981 | Williams et al. ............ | 172/184 |

(Continued)

OTHER PUBLICATIONS

Office Action from U.S. Appl. No. 11/524,969 dated Oct. 4, 2007.

*Primary Examiner*—Robert E Pezzuto
*Assistant Examiner*—Matthew D Troutman
(74) *Attorney, Agent, or Firm*—Westman, Champlin & Kelly, P.A.

(57) ABSTRACT

A scraper for mounting to a tool bar of a farm implement having at least one rotating disk for tilling soil, including a support mounted to the tool bar and a shaft pivotally attached to and extending from the support where the shaft has a central axis. A scraper blade is rotatably attached to an end of the shaft and the scraper blade comprises a perimeter wherein the shaft pivots to rotatably engage a side surface of the rotating disk to prevent soil from accumulating on the side surface and prevents debris from accumulating between the side surface and the scraper blade.

20 Claims, 3 Drawing Sheets

U.S. PATENT DOCUMENTS

| | | | |
|---|---|---|---|
| 4,330,041 A | 5/1982 | Ankenman | 172/566 |
| 4,628,840 A | 12/1986 | Jacobson | 111/7 |
| 4,669,550 A | 6/1987 | Sittre | 172/559 |
| 4,736,803 A | 4/1988 | Roush | 172/560 |
| 4,781,129 A * | 11/1988 | Swanson et al. | 111/167 |
| 6,024,179 A | 2/2000 | Bourgault | 172/566 |
| 6,237,696 B1 | 5/2001 | Mayerle | 172/558 |
| 6,237,697 B1 | 5/2001 | Butterfield et al. | 172/566 |
| 6,260,632 B1 | 7/2001 | Bourgault et al. | 172/566 |
| 6,386,127 B1 | 5/2002 | Prairie et al. | 111/167 |
| 6,640,732 B2 | 11/2003 | Prairie et al. | 111/167 |
| 6,644,224 B1 | 11/2003 | Bassett | 111/157 |
| 6,659,193 B1 | 12/2003 | Best et al. | 172/566 |
| 6,695,069 B2 | 2/2004 | Rozendaal | 172/601 |
| 6,698,528 B2 | 3/2004 | Best et al. | 172/566 |
| 2002/0125019 A1 | 9/2002 | Rozendaal | 172/705 |
| 2003/0015328 A1 | 1/2003 | Prairie et al. | 172/558 |
| 2004/0000411 A1 | 1/2004 | Best et al. | 172/705 |
| 2004/0000412 A1 | 1/2004 | Best et al. | 172/734 |

* cited by examiner

SCRAPER WITH ROTATING BLADE FOR ENGAGING A ROTATING DISK

CROSS REFERENCE TO RELATED APPLICATION(S)

This application is a continuation-in-part of U.S. patent application Ser. No. 11/524,969 which was filed on Sep. 21, 2006, which is incorporated by reference herein in its entirety, which claims the benefit of U.S. Provisional Application Ser. No. 60/734,824 filed on Nov. 9, 2005 which is incorporated by reference herein in its entirety.

BACKGROUND OF THE INVENTION

The present invention relates to a scraper for a farm implement. More particularly, the present invention relates to a scraper having a rotating blade that is attached to a farm implement.

There are many types of farm implements that are used to till soil in preparation for seeding or planting. One such farm implement is a tandem disk.

A typical configuration of a tandem disk includes a front gang of disks proximate a front end of the tandem and a back gang of disks proximate a back end of the tandem disk. The front gang of disks are configured generally in a V-shaped pattern and the back gang of disks are configured in the inverse V-shaped pattern.

As the tandem disk is pulled through the field by a tractor, or other prime mover, the front gang of disks mulches debris on the surface and also tills the soil by forcing the soil transversely away from a plane in the direction of travel of the tractor and the tandem disk. The back gang of disks also mulch debris and tills the soil by forcing the soil transversely towards the plane of travel of the tractor and the tandem disk.

However, when the soil is moist or wet while being tilled with a tandem disk, the soil has a tendency of accumulating on a concave surface of the disks. As soil accumulates on the concave surface of the disk, the disk looses its effectiveness in penetrating the soil and mulching the debris.

To prevent soil from accumulating on the concave surface of the disk, static, rigid scrapers are typically positioned near the concave surface of the disk. However, the static, rigid scrapers have a tendency of bending or rotating away from the concave surface of the disk and thereby allow the wet soil to accumulate on the concave surface of the disk which adversely affects the ability of the disk to till the soil and mulch the debris. Further, the debris has a tendency of collecting between the static scraper and the disk which may prevent the disk from rotating.

SUMMARY OF THE INVENTION

The present invention includes a scraper for mounting to a tool bar of a farm implement having at least one rotating disk for tilling soil. The scraper includes a support mounted to the tool bar and a shaft pivotally attached to and extending from the support where the shaft has a central axis. A scraper blade is rotatably attached to an end of the shaft and the scraper blade comprises a perimeter wherein the shaft pivots to engage a side surface of the rotating disk to prevent soil from accumulating on the side surface and also prevents debris from accumulating between the side surface and the scraper blade.

The present invention also includes a farm implement having at least one rotating disk for tilling soil and a tool bar proximate the at least one rotating disk. The farm implement also includes at least one scraper attached to the tool bar where the scraper includes a support mounted to the tool bar and a shaft pivotally attached to and extending from the support where the shaft has a central axis. A scraper blade is rotatably attached to an end of the shaft and wherein the scraper blade has a perimeter wherein the shaft pivots to engage a side surface of the rotating disk to prevent soil from accumulating on the side surface and prevents debris from accumulating between the side surface and the scraper blade.

DETAILED DESCRIPTION OF ILLUSTRATIVE EMBODIMENTS

Figure 1:
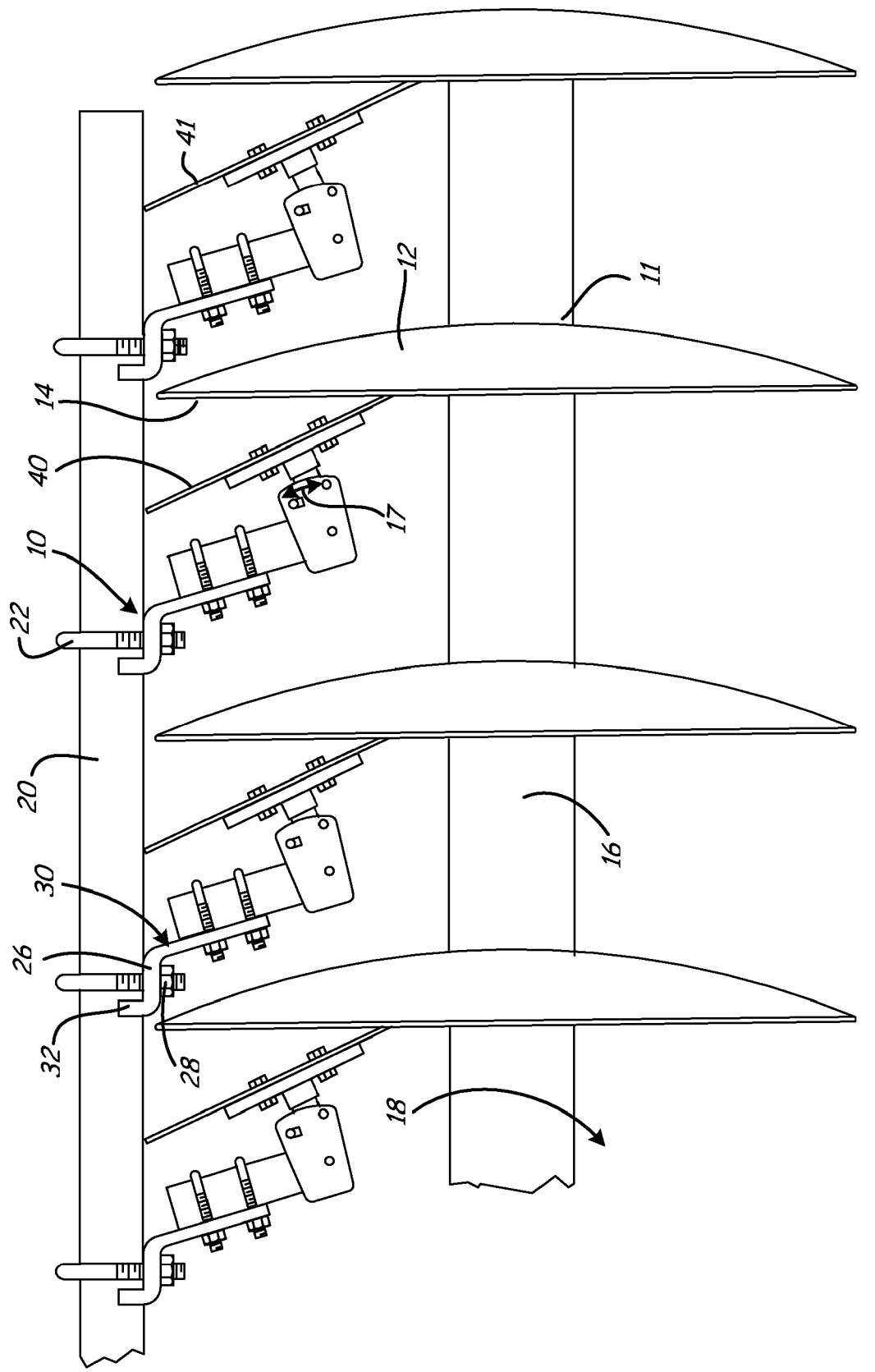
FIG. 1 is a side view of a portion of a gang of disks having a rotating scraper engaging a concave surface of each disk.

A rotating scraper for a disk blade attached to a farm implement is generally illustrated in FIG. 1 at 10. Each rotating scraper 10 includes a scraper blade 40 that rotatably engages a side surface 14 of a disk blade 12 to prevent soil and/or debris from accumulating on the disk blade 12. Typically, the side surface 14 of the disk blade 12 is concave, however the side surface 14 could also be substantially flat or convex.

Typically, the rotating scraper 10 is attached to a tool bar 20 of a tandem disk where the disk blades 12 are secured to a shaft 16 to form a gang 13 of a tandem disk. The disks 12 rotate along with the shaft 16 in the rotational direction of arrow 18. While the rotating scraper 10 is typically utilized with a tandem disk, the rotating scraper 10 can also be utilized with disks on other agricultural equipment.

Typically, the disk blades 12 have a circular perimeter 11 that penetrates the ground between about one inch and about six inches depending upon the farm implement being utilized. The scraper blade 40 typically has a circular perimeter 41 that engages the side surface 14 of disk blade 12 in an arcuate engagement extending between two points on the perimeter 11 on the side surface 14 of the disk blade 12 where a lowest contact point of the perimeter 41 of the scraper blade 40 with the side surface 14 of the disk blade 12 is beneath the deepest penetration depth of the disk blade 12, thereby preventing soil from accumulating on the side surface 14 or debris from accumulating between the side surface 14 and the scraper blade 40.

The rotating scraper 10 can be utilized to prevent soil from accumulating on a surface ranging from a concave configuration as illustrated in FIG. 1, to a substantially flat configuration to convex configuration depending upon the angle of the support utilized to attach the scraper blade 40 to the tool bar 20. For a flat vertical surface, the support utilized would be configured to position the scraper blade 40 in a substantially vertical position. For a convex surface the support would be configured to position the scraper blade 40 into engagement with the side surface 14 of the disk blade 12 along one side of the disk blade 12 where the perimeter of the scraper blade 40 engages the perimeter of the side surface 14 of the disk blade 12. In any configuration of the support, the rotating scraper 10 would include a shaft attached to the support where the shaft attaches to the scraper blade 40 in a manner that allows the scraper blade 14 to rotate about the axis of the shaft.

Figure 2:
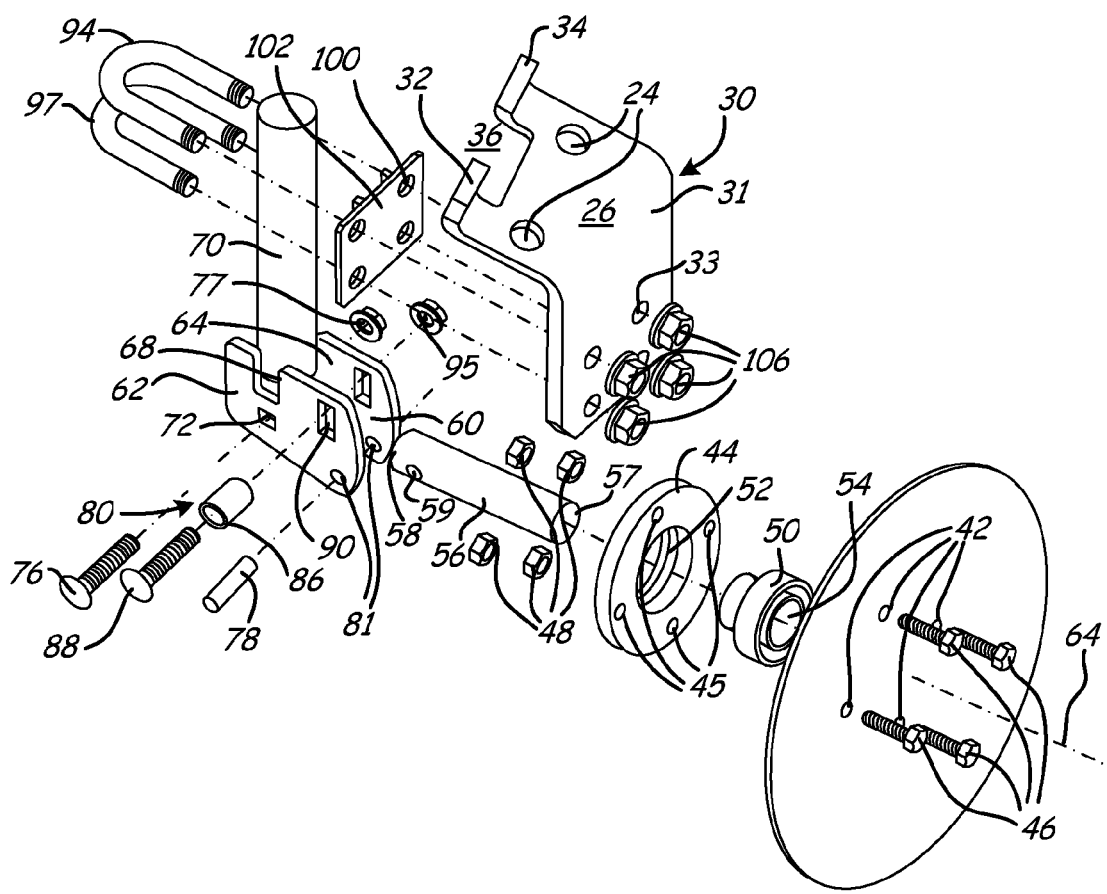
FIG. 2 is an exploded view of the rotating scraper of the present invention.

Referring to FIGS. 1 and 2, each of the rotating scrapers 10 is secured to the tool bar 20, or other frame member, by positioning a U-shaped bolt 22 over the tool bar 20 and through apertures 24 in a substantially flat surface 26 of a mounting bracket 30. The U-shaped bolt 22 is secured to the mounting bracket 30 with a threaded engagement of threaded ends of the bolt 22 with nuts 28 to prevent the lateral movement of the mounting bracket 30 along a length of the tool bar 20.

The mounting bracket 30 also includes left and right tabs 32 and 34, respectively, that define a channel 36 having a width sufficient to position the left and right tabs 32 and 34 on opposite sides of a substantially square or rectangular cross-sectional tool bar 20. The engagement of the tabs 32, 34 with the sides of the tool bar 20 prevent rotational movement of the mounting bracket with respect to the tool bar 20.

Figure 3:
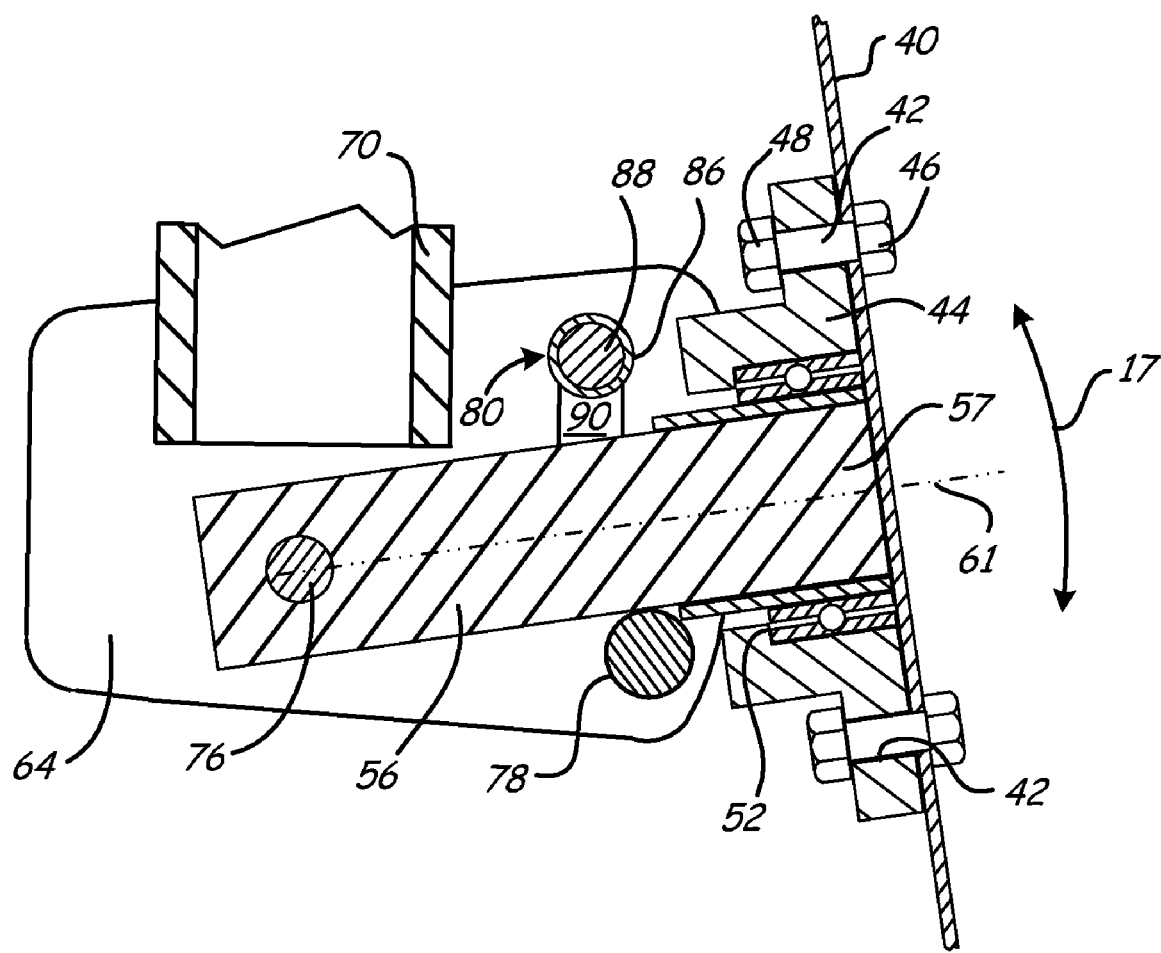
FIG. 3 is a sectional view of the rotating scraper of the present invention.

Referring to FIGS. 2 and 3, the rotating scraper blade 40 is attached to a collar 44 with a plurality of bolts 46. The bolts 46 are positioned through apertures 42 in the rotating scraper blade 40 and apertures 45 in the collar 44, and are threadably engaged by the nuts 48 to removeably secure the rotating scraper blade 40 to the hub 44. However, other attachment mechanisms besides a bolt and nut are also contemplated.

A bearing 50, typically a ball type roller bearing, is retained between the hub 44 and the scraper blade 40 with the threaded engagement of the bolts 46 with the nuts 48. The collar 44 includes a shoulder 52 which retains the bearing 50 between the collar 44 and the rotating disk 40. The shoulder 52 prevents the bearing 50 from being removed from the collar 44 without first removing the nuts 48 from the bolts 46 and detaching the dish 40 from the collar 44.

With the bearing 50 retained between the collar 44 and the rotating disk 40, a distal end 57 of a shaft 56 is positioned within a bore 54 in the bearing 50 and is attached to the bearing 50 typically with at least one set screw (not shown). The shaft 56 and the bearing 50 may also be a one-piece construction such that the set screw, or other fastening mechanism, is not necessary to prevent bearing 50 from slipping about a surface of the shaft 56.

A proximate end 58 of the shaft 56 is positioned within a slot 60 defined by left and right plates 62, 64, respectively, which are fixedly attached to a distal end 68 of the shank 70, typically with a weld. The left and right plates 62, 64 include apertures 72 which are aligned with an aperture 59 in the shaft 56 proximate the proximal end 53. A bolt 76 is positioned between the apertures 72 in the plates 62, 64 and the aperture 59 in the shaft 56 to pivotally attach the shaft 56 to the left and right plates 62, 64. A nut 77 threadably engages the bolt 76 to retain the shaft 56 between the plates 62, 64. However, other fastening mechanisms besides a bolt and nut are also contemplated.

The pivotal movement of the shaft 56 is limited by a bottom stop 78 and a top stop 80. The bottom stop 78 is positioned within the slot 66 between the left and right plates, where the stop typically is a metal rod that is positioned through apertures 81 in the left and right plates 62, 64 and secured in position with welds. The bottom stop limits downward pivotal movement of the shaft 56. While a metal rod is typical a stop having a bushing secured with a threaded engagement of a bolt with a nut is also contemplated.

The top stop 80 includes a bushing 86 that is positioned within the slot 66. The bushing 86 includes an opening that aligns with slots 90 in the left and right plates 62, 64 such that bolt 88 is positioned therethrough. A nut 95 threadably engages the bolt 84 to retain the top stop 80 within the slot 66. The bolt 88 is positionable within the vertical slots 90 such that the position of the top stop 80 is adjustable which allows the amount of pivotal travel of the shaft 53 to be varied.

The shaft 56 is attached to the left and right plates 62, 64 which are components of a support 30. The support 30 also includes a shank 70 that is preferably a pipe having a continuous circular wall. However the shank 70 may also be constructed from a square or rectangular cross-sectional tube as well as a solid material such as steel.

The shank 70 is secured to an angled portion 31 of the mounting bracket 30 with top and bottom U-shaped bolts 94, 96 positioned about the shank 58 and through apertures 100 in a friction plate 102 and apertures 33 in the slanted portion 31 of the mounting bracket 30. With the U-shaped bolt 94 and 96 positioned about the shank 70 hand through the apertures 100, lock washers (not shown) are typically positioned about the threaded ends of the U-shaped bolts 62 and 64 and nuts 101 are threadably engaged with the threaded ends of the U-shaped bolts 96 and 98 to frictionally secure the shank 70 to the friction plate 102 in a selection position.

In operation, rotation of the disk blade 12 in direction of arrows 18 causes the disk blade 40 to rotate about the stub shaft 50 either clockwise or counter-clockwise about the axis 61 in a rotation of least resistance. Rotation of the scraper blade 40 as the disk blade 12 rotates in direction of arrows 18, prevents soil from accumulating on the side surface 14 of the disk blade 12.

The scraper blade 40 is typically positioned between about one quarter and one half of an inch away from the concave surface 14 of the disk 12. However, the scraper blade 40 may also be placed in contact with the disk 12. As dirt and debris begin to accumulate on the disk 12, the scraper disk blade 40 engages the dirt and begins to pivot about the bolt 76 in the direction of arrows 17 and move upwardly on the disk 12. As the scraper blade 40 pivots upwardly, the distance between the concave surface 14 of the disk 12 and the scraper blade 40 is reduced such that the scraper blade 40 engages the concave surface 14 of the disk 12. With the scraper blade 40 in engagement with the concave surface 14 of the disk 12, the scraper blade 40 removes the dirt and debris from the disk 12, thereby allowing the disk to penetrate the ground in an efficient manner.

Once dirt has been removed from the disk 12, the scraper blade 40 then pivots downwardly in the direction of the arrows 17 until the shaft 56 contacts the bottom stop 78. With the shaft 56 engaging the bottom stop, the scraper blade 40 is positioned away from the disk 12 in a selected position. If no dirt or debris collects on the disk 12 due to the conditions of the soil and the debris on the surface of the soil, the scraper blade 40 does not engage the disk 12 and will not rotate thereby extending the life of the scraper blade 40 which may be caused by erosion and wear.

Although the present invention has been described with reference to preferred embodiments, workers skilled in the art will recognize that changes may be made in form and detail without departing from the spirit and scope of the invention.

What is claimed is:

1. A scraper for mounting to a tool bar of a farm implement having a rotating disk for tilling soil, the scraper comprising:
   a support mounted to the tool bar, the support comprising a shank having a first end and a second end and an upper stop and a lower stop in communication with the shank, the shank being non-movably attachable to the tool bar proximate a first end of the shank;
   a shaft extending from the shank and having a central axis, a first end and a second end, the shaft pivotally attached to the shank proximate the second end of the shank wherein the shaft is positioned between the upper stop and the lower stop such that the upper stop and the lower stop limit the pivotal movement of the shaft; and a scraper blade rotatably attached to the shaft proximate the second end of the shaft and wherein the scraper blade comprises a perimeter and wherein the shaft pivotally moves while the rotating disk is rotating to rotatably engage the perimeter of the scraper blade with a side surface of the rotating disk to remove soil and debris that accumulates on the side surface.

2. The scraper of claim 1 and wherein the support further comprises:

left and right plates attached to opposite sides of the shank proximate the second end of the shank wherein the left and right plates define a slot there between.

3. The scraper of claim 2 and wherein the shaft is positioned within the slot.

4. The scraper of claim 3 and wherein the shaft comprises an aperture proximate the first end that aligns with a first set of apertures in the left and right plates such that a securing mechanism is positioned through the apertures to pivotally attach the shaft to the shank.

5. The scraper of claim 3 and further comprising the upper stop and the lower stop positioned within the slot.

6. The scraper of claim 1 and wherein a position of the upper stop is adjustable.

7. The scraper of claim 1 and further comprising a bearing attached to the second end of the shaft for rotating the scraper blade about the shaft.

8. The scraper of claim 1 and wherein the scraper blade comprises a circular perimeter and wherein the scraper blade rotates clockwise or counterclockwise in the path of least resistance when contacting the rotating disk.

9. The scraper of claim 1 and wherein the support further comprises a mounting bracket secured to the shank wherein the mounting bracket attaches to the tool bar.

10. A farm implement comprising:

at least one rotating disk for tilling soil;

a tool bar proximate the at least one rotating disk; and at least one scraper attached to the tool bar, the scraper comprising:

a support mounted to the tool bar, the support comprising a shank having a first end and a second end and an upper stop and a lower stop in communication with the shank, the shank being non-movably attached to the tool bar proximate a first end of the shank;

a shaft extending from the support and having a central axis, a first end and a second end, the shaft pivotally attached to the shank proximate the second end of the shank wherein the shaft is positioned between the upper stop and the lower stop such that the upper stop and the lower stop limit the pivotal movement of the shaft; and a scraper blade rotatably attached to the shaft proximate the second end of the shaft and wherein the scraper blade comprises a perimeter and wherein the shaft pivotally moves while the rotating disk is rotating to rotatably engage the perimeter of the scraper blade with a side surface of the rotating disk to remove soil and debris that accumulates on the side surface.

11. The farm implement of claim 10 and wherein the support further comprises:

left and right plates attached to opposite sides of the shank proximate the second end of the shank wherein the left and right plates define a slot there between.

12. The farm implement of claim 11 and wherein the shaft is positioned within the slot.

13. The farm implement of claim 11 and wherein the shaft comprises an aperture proximate the first end that aligns with a first set of apertures in the left and right plates such that a securing mechanism is positioned through the apertures to pivotally attach the shaft to the support.

14. The farm implement of claim 12 and further comprising the upper stop and the lower stop positioned within the slot.

15. The farm implement of claim 14 and wherein a position of the upper stop is adjustable.

16. The farm implement of claim 10 and further comprising a bearing attached to the second end of the shaft and the scraper blade for rotating the scraper blade about the shaft.

17. The farm implement of claim 10 and wherein the scraper blade comprises a circular perimeter and wherein the scraper blade rotates clockwise or counterclockwise in the path of least resistance when contacting the rotating disk.

18. The farm implement of claim 10 and wherein the support comprises a mounting bracket secured to the shank wherein the mounting bracket attaches to the tool bar.

19. The farm implement of claim 10 and wherein the at least one disk includes a concave side surface.

20. A scraper for mounting to a tool bar of a farm implement having a rotating disk for tilling soil, the scraper comprising:

a support mounted to the tool bar, the support comprising:
a shank having a first end and a second end wherein the shank is non-movably attachable to the tool bar proximate the first end of the shank;
a plate attached to the shank proximate the second end of the shank; and
an upper stop attached to the plate and a lower stop attached to the plate;

a shaft extending from the shank and having a central axis, a first end and a second end, the shaft pivotally attached to the shank proximate the second end of the shank wherein the shaft is positioned between the upper stop and the lower stop such that the upper stop and the lower stop limit the pivotal movement of the shaft; and a scraper blade rotatably attached to the shaft proximate the second end of the shaft and wherein the scraper blade comprises a perimeter and wherein the shaft pivotally moves while the rotating disk is rotating to rotatably engage the perimeter of the scraper blade with a side surface of the rotating disk to remove soil and debris that accumulates on the side surface.

* * * * *